Figure 1:
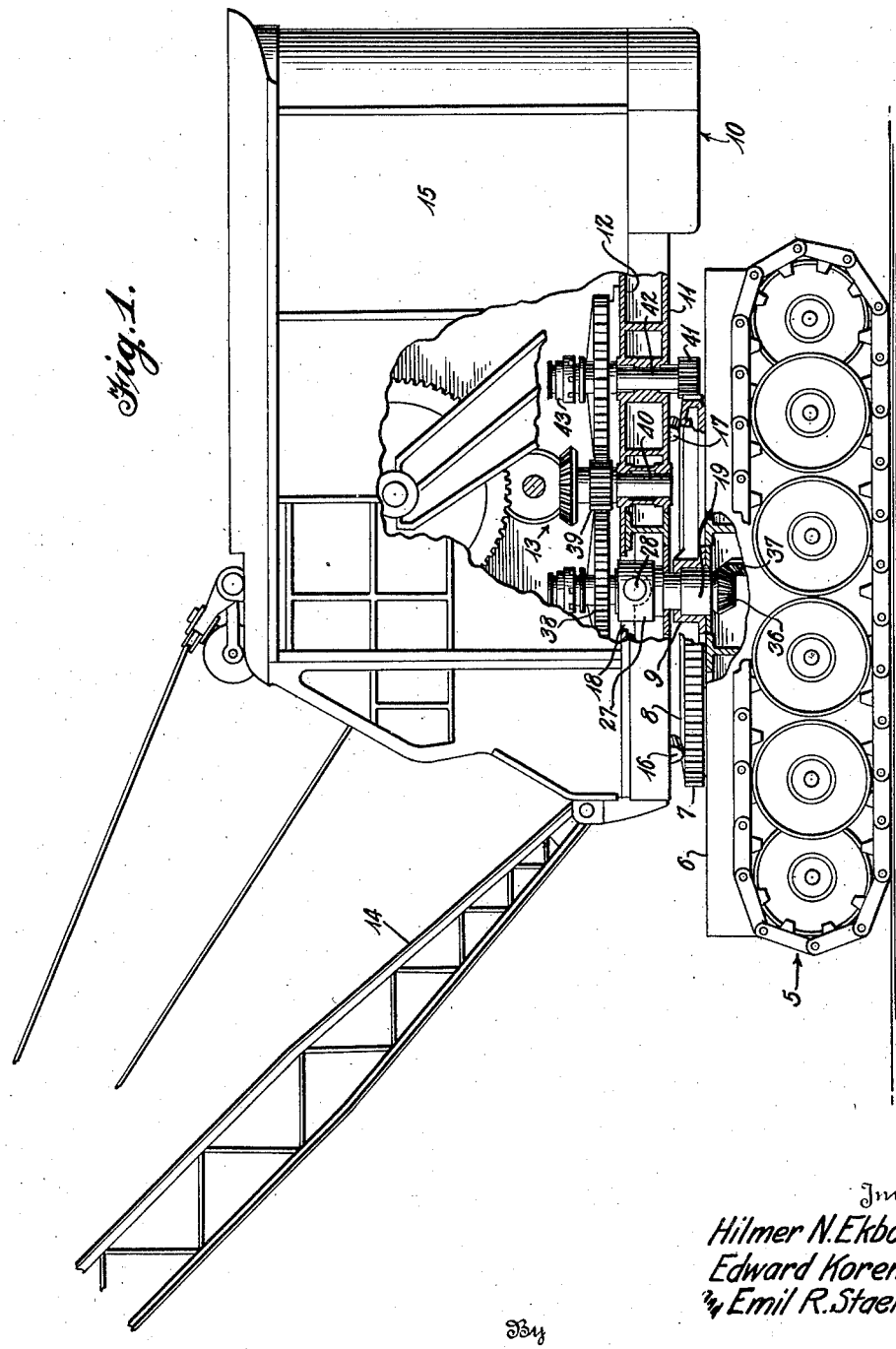

Feb. 21, 1939.  H. N. EKBOM ET AL  2,147,973
CENTER PIN CONSTRUCTION
Filed April 5, 1938  3 Sheets-Sheet 1

Inventors
Hilmer N. Ekbom,
Edward Korensky
Emil R. Staehelin
By
L. Donald Myers  Attorney

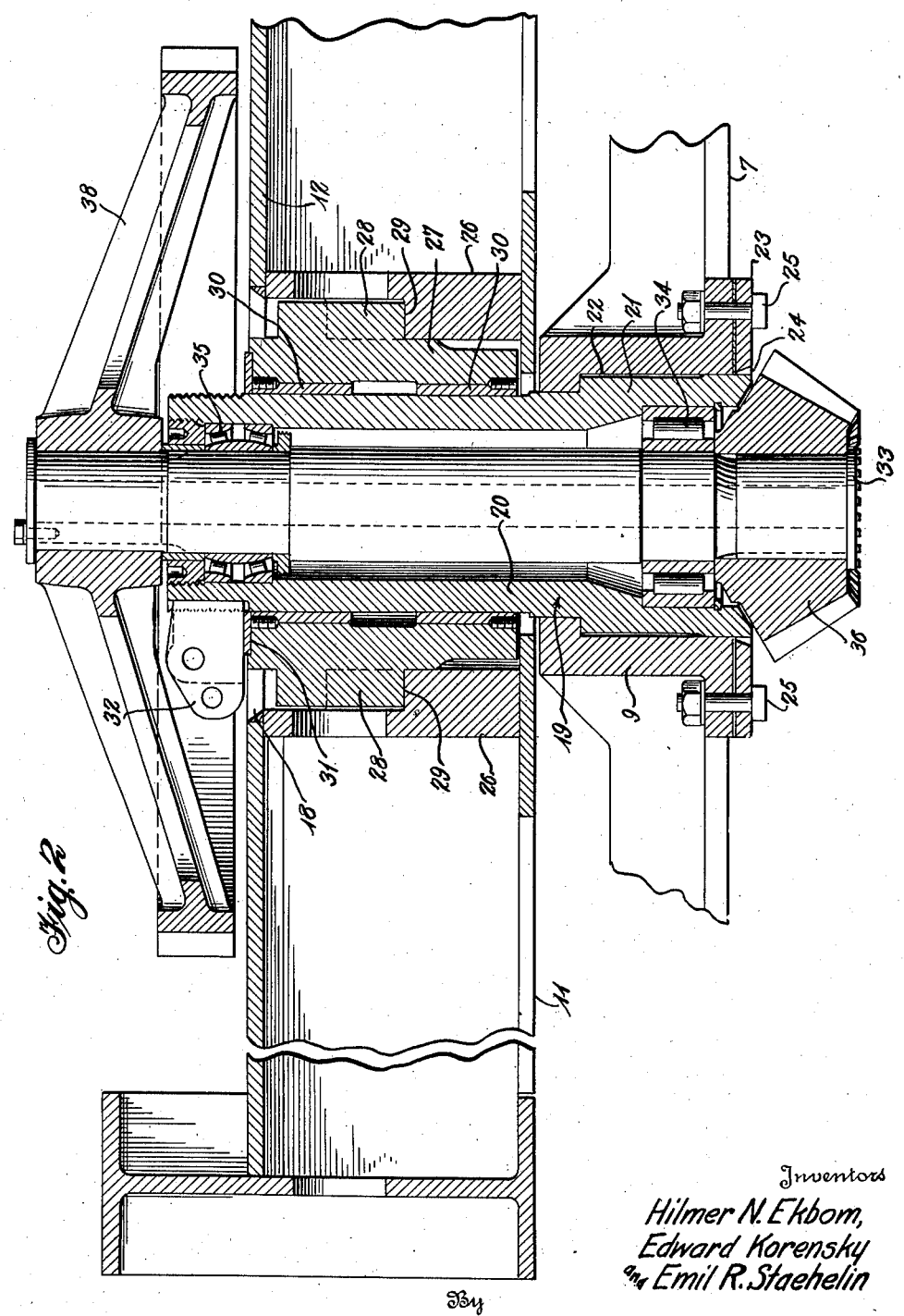

Feb. 21, 1939.  H. N. EKBOM ET AL  2,147,973
CENTER PIN CONSTRUCTION
Filed April 5, 1938  3 Sheets-Sheet 3
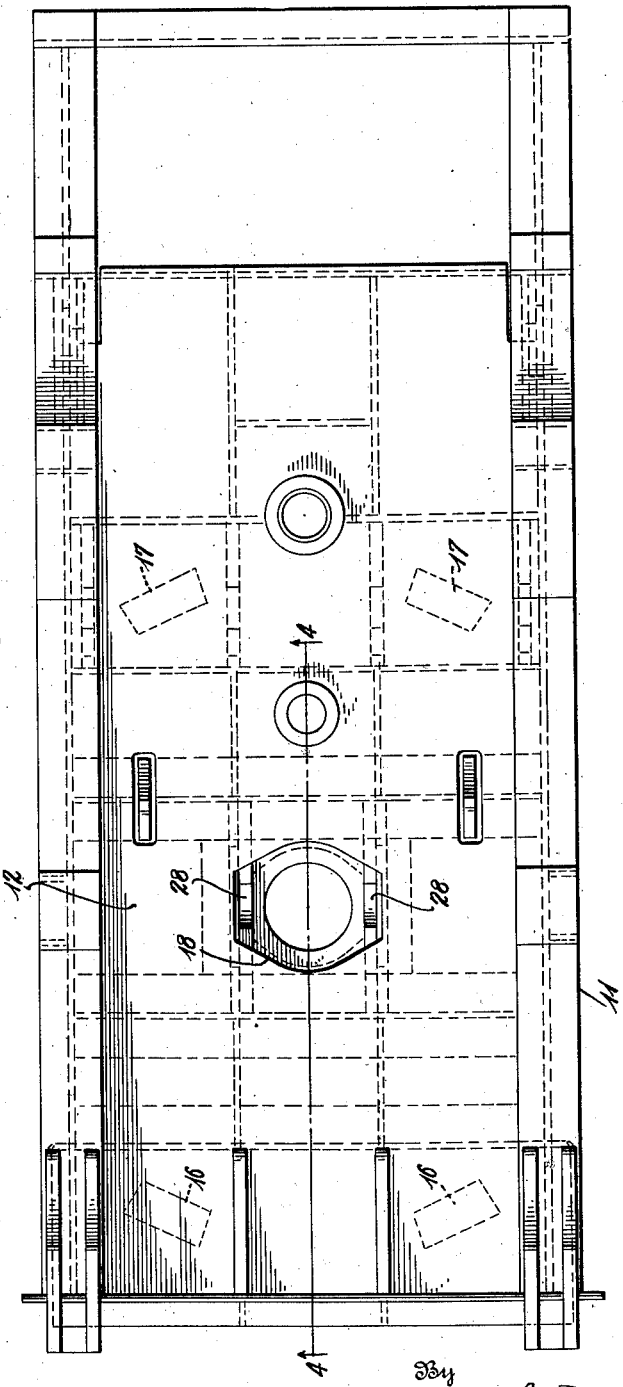
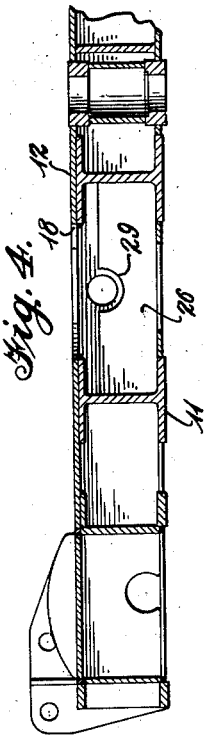
Inventors
Hilmer N. Ekbom,
Edward Korensky
By Emil R. Staehelin
L. Donald Myers
Attorney Patented Feb. 21, 1939

2,147,973

UNITED STATES PATENT OFFICE 2,147,973

CENTER PIN CONSTRUCTION

Hilmer N. Ekbom and Edward Korensky, Chicago, and Emil R. Staehelin, Glencoe, Ill., assignors to Link-Belt Company, a corporation of Illinois Application April 5, 1938, Serial No. 200,280

20 Claims. (Cl. 212—70)

This invention relates to new and useful improvements in center pin constructions especially adapted for use in locomotive and crawler cranes, shovels, and the like.

In locomotive and crawler cranes, shovels, draglines, and the like, it is a common practice to mount the upper rotating structure on a roller circle or race, usually formed as a part of a ring gear, which is secured to the car body or truck frame and to center this structure on a center pin generally secured to the car body or truck frame and on which center pin the upper structure rotates. The vertical loads are generally transmitted from the upper rotating structure to the car body or truck frame by means of rollers which engage and travel on the roller circle or race.

The center of gravity of the upper rotating structure naturally shifts as loads are lifted and deposited. If the loads are not sufficiently heavy to shift the center of gravity to such an extent as to move it outside of the ring circle or race, all of the rollers will bear on their race and will support the load without placing any tension on the center pin. However, the roller circle or race generally is of such a small diameter that the handling of even maximum rated loads results in moving the center of gravity outside the ring circle or race with the result that the upper structure frequently is rotating with its center of gravity so displaced. This displacement of the center of gravity imposes a tension in the center pin which, of course, must be so constructed that it can withstand this strain. In order to avoid binding between the center pin parts and the rollers on the roller circle or race, it is necessary to provide a certain amount of play or clearance with the result that when the upper structure rotates with the center of gravity located in front of the roller circle, the rear rollers are actually lifted from the roller race while all of the play or clearance in the center pin unit is taken up causing an angularity between the rotating base and the center pin thrust washer. While rotating in this manner, an uneven load is imposed on all of the radial and thrust bearings of the center pin units, on the front rollers and on the means employed for maintaining the aforementioned play or clearance. The center pin also has imposed thereon heavy bending stresses.

It is the primary object of this invention to provide a center pin construction which will overcome all of the aforementioned disadvantages inherent in conventional center pin practice.

More specifically, it is the principal object of this invention to provide a center pin construction which will permit the center of gravity of the upper rotating structure to be displaced outside of the roller circle or race without imposing bending stresses on the center pin unit and without imposing uneven loads on the radial and thrust bearings associated with said unit.

A still further object of the invention is to provide a novel form of connection between the upper rotating structure and the center pin which will permit the said upper structure to rock as the center of gravity shifts without imposing undue strains or stresses and uneven loads on any portion of the rotating base.

Other objects and advantages of the invention will be apparent during the course of the following description.

In the accompanying drawings forming a part of this specification and in which like numerals are employed to designate like parts throughout the same, Figure 1 is a side elevational view, partly broken away, of a crawler type of crane or shovel embodying this invention, Figure 2 is a vertical sectional view taken through the center pin portion of the machine illustrated in Fig. 1, Figure 3 is a plan view of the frame portion and floor of the upper rotatable structure disclosed in Fig. 1, and Figure 4 is a fragmentary vertical sectional view taken on line 4—4 of Fig. 3.

In the drawings, wherein for the purpose of illustration is shown the preferred embodiment of this invention, and particularly referring to Fig. 1, there is shown a crawler or traveling tread type of crane, shovel, dragline, or the like. It is to be understood, however, that the illustration of this type of machine is not to act as a limitation on the scope of the claims for the invention is equally applicable to a locomotive type of unit as distinguished from the crawler type and is applicable to any type of machine which includes heavy load manipulating mechanism which is rotatably supported on a transporting unit.

Still referring to Fig. 1, the reference character 5 designates in its entirety a crawler or traveling tread type of traction device. The chassis, car body or truck frame 6 of this device has rigidly secured thereto the ring gear 7 which is provided on its upper surface with a beveled roller circle or race 8. A hub 9 is provided for the ring gear 7 and is concentrically positioned with respect to the periphery thereof.

Mounted to rotate with respect to the traction device 5 is an upper structure which is designated in its entirety by means of the reference character 10. This upper rotating structure includes a main or base frame 11 which is shown in detail in Fig. 3, while sections of the same are illustrated in Figs. 1, 2 and 4. A floor plate 12 is suitably mounted on and secured to the several beams and webs which collectively form the frame 11. Suitable mechanism, designated in its entirety by the reference character 13, is mounted on the frame 11 and is employed for driving the traction device 5, for rotating the upper unit 10 with respect to the traction device, and for operating the boom or mast 14 and its load handling instrumentality, not shown. A suitable cab or house 15 is mounted on the frame 11 for housing the mechanism 13 and the operator of the machine.

Referring to Figs. 1 and 3, it will be seen that the upper rotating structure 10, through its frame 11, is rotatably supported on the traction device 5 by means of the pair of front rollers 16 and the pair of rear rollers 17. Concentrically positioned with respect to the two pairs of rollers is an opening 18 which is cut in the floor plate 12 of the frame. This opening is further clearly illustrated in Figs. 1, 2 and 4.

As is clearly illustrated in Figs. 1 and 2, a center pin unit, designated in its entirety by the reference character 19, is employed for centering the upper structure 10 with respect to the roller circle or race 8 and for rotatably connecting the upper structure 10 to the car body or truck frame 6 of the traction device 5.

This center pin unit consists of the tubular center pin 20 which is enlarged at its lower end 21 to fit within an enlarged bore portion 22 formed in the hub 9 of the combined ring gear 7 and roller circle or race 8. To connect the center pin 20 to the hub 9, a collar 23 is welded to the center pin, as at 24, and is bolted to the hub by means of the bolt and nut devices 25. Fig. 2 clearly discloses the center pin 20 as extending up through the frame 11 between the parallel web plates 26 of the frame and through the opening 18 formed in the floor plate 12.

To rotatably connect the upper structure 10 to the center pin 20, a special form of swivel block 27 is provided. This swivel block is positioned over the upper portion of the center pin 20 by passing the same through the opening 18 formed in the floor plate 12. This swivel block is provided with diametrically positioned, axially aligned trunnions 28. As shown in Figs. 2 and 4, the trunnions 28 are adapted to be seated in sockets 29 formed in the web plates 26. By carefully inspecting Fig. 4, it will be seen that these sockets 29 are slightly more than semi-circular in shape and that they extend somewhat above the common axis of the two trunnions 28 so as to allow for taking up clearance between the center pin 20 and the pairs of rollers 16 and 17.

The bore of the swivel block 27 has mounted therein bushings 30 which function as radial bearings for the center pin. A thrust washer 31 is associated with the upper end of the swivel block for taking all the thrust induced by the center pin tension. A two-part nut 32 is threadedly connected to the upper end of the center pin 20 and bears against the thrust washer 31. Adjustment of this nut 32 determines the play or clearance between the center pin and the rotating rollers 16 and 17.

As is customary in structures of this character, a vertical travel shaft 33 is journaled in the bore of the center pin 20 by means of the anti-friction bearing units 34 and 35. A bevel pinion 36 is keyed to the lower end of the shaft 33 and meshes with the bevel gear 37, see Fig. 1, which drives the tread or endless tracks of the traction device 5. An upper gear 38 is keyed to the upper end of the travel shaft 33 and meshes with a pinion 39 carried by a stub shaft 40. Power is applied to this stub shaft in any desired manner.

To effect rotation of the upper structure 10 with respect to the traction device 5, a pinion 41 meshes with the teeth of the ring gear 7. This pinion 41 is fixed on the swing shaft 42 which has selectively clutched to its upper end portion a gear 43, also meshing with the pinion 39 mounted on the stub shaft 40.

By inspecting the various figures, it will be seen that the common axis for the trunnions 28 of the swivel block 27 is arranged normal with respect to the axis of the center pin 20. This axis for the trunnions also extends transversely of the frame 11 which forms a part of the upper rotatable structure 10. This trunnion axis, as shown best in Fig. 3, is located midway between the two pairs of rollers 16 and 17.

When the upper structure 10 is caused to rotate with respect to the traction device 5, the frame 11, and all of its carried parts, rotates relative to the center pin. This rotation takes place between the center pin and the bearing bushings 30 mounted within the bore of the swivel block 27. Due to the mounting of the swivel block in the sockets 29 of the frame web plates 26, the swivel block naturally will swing or rotate with the upper structure 10.

As loads are picked up by the boom or mast 14, the center of gravity for the upper rotatable structure 10 naturally moves forwardly or toward the front of this structure. If the weight of the load is not sufficient to move the center of gravity for the structure 10 outside of the roller circle or race 8, the structure 10 will be balanced on both pairs of rollers 16 and 17 and no appreciable movement takes place between the frame 11 and the swivel block 27. However, when the load is heavy enough to move the center of gravity for the rotatable structure 10 forwardly, outwardly of the roller circle or race 8, the upper structure 10 will be caused to tilt forwardly. This tilting movement is taken care of by the trunnions 28 which are seated in the sockets 29. The tilting of the upper structure 10, therefore, does not impose any lateral shear or bending stresses on the center pin and the bushings 30 are not unevenly loaded. The adjustment nut 32 and the thrust washer 31 also are maintained free from uneven loads. It will be appreciated; therefore, that all of the disadvantages inherent in conventional center pin practice will be overcome by this center pin construction.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, we claim:—

1. A center pin construction for locomotive and crawler cranes, shovels, and the like, comprising a truck frame having a roller circle or race associated therewith, an upper structure including a frame having a floor plate mounted thereon which is provided with an opening, rollers carried by the frame for supporting the upper structure on said roller circle or race, a center pin fixed with respect to the truck frame and extending into the frame of the upper structure in alignment with said floor plate opening, and means for rotatably and rockably associating the upper structure with respect to the center pin, said means including an element adapted to be applied to and removed from said center pin through said floor plate opening and carrying radial and thrust bearings for the center pin.

2. A center pin construction for locomotive and crawler cranes, shovels, and the like, comprising a truck frame having a roller circle or race associated therewith, an upper structure including a frame having a floor plate mounted thereon which is provided with an opening, rollers carried by the frame for supporting the upper structure on said roller circle or race, a center pin fixed with respect to the truck frame and extending into the frame of the upper structure in alignment with said floor plate opening, a tubular swivel block applied to the center pin through said floor plate opening, said block carrying radial and thrust bearings for the pin, and means for rockably mounting the block in the frame of the upper structure.

3. A center pin construction for locomotive and crawler cranes, shovels, and the like, comprising a truck frame having a roller circle or race associated therewith, an upper structure including a frame having a floor plate mounted thereon which is provided with an opening, rollers carried by the frame for supporting the upper structure on said roller circle or race, a center pin fixed with respect to the truck frame and extending into the frame of the upper structure in alignment with said floor plate opening, a tubular swivel block applied to the center pin through said floor plate opening, said block carrying radial and thrust bearings for the pin, trunnions formed on said swivel block, and sockets formed in the upper structure frame to receive said trunnions.

4. A center pin construction for locomotive and crawler cranes, shovels, and the like, comprising a car body or truck frame having a roller circle or race associated therewith, an upper structure having rollers supporting the same on said roller circle or race, a tubular center pin fixed with respect to the truck frame and concentric with the roller circle or race, a shaft journaled in the bore of the center pin to deliver power from the upper structure to the truck frame, a bearing element journaled on the center pin for rotary movement only, adjustable means associated with the center pin and the bearing element for receiving the center pin tension and for determining the play between the center pin and the said rollers, and means for connecting the upper structure to the bearing element in a manner to cause the bearing element and the center pin to maintain the rollers registering with the roller circle while permitting the upper structure to freely tilt relative to the truck frame without imposing undue strains, stresses and uneven loads on the bearing element, the center pin and said adjustable means.

5. A center pin construction for locomotive and crawler cranes, shovels, and the like, comprising a car body or truck frame having a roller circle or race associated therewith, an upper structure having rollers supporting the same on said roller circle or race, a tubular center pin fixed with respect to the truck frame and concentric with the roller circle or race, a shaft journaled in the bore of the center pin to deliver power from the upper structure to the truck frame, a bearing element journaled on the center pin for rotary movement only, adjustable means associated with the center pin and the bearing element for receiving the center pin tension and for determining the play between the center pin and the said rollers, and means for connecting the upper structure to the bearing element in a manner to cause the bearing element and the center pin to maintain the rollers registering with the roller circle while permitting the upper structure to freely tilt relative to the truck frame without imposing undue strains, stresses and uneven loads on the bearing element, the center pin and said adjustable means, said connecting means being constructed to allow for taking up play between the center pin and the said rollers by said adjusting means.

6. A center pin construction for locomotive and crawler cranes, shovels, and the like, comprising a car body or truck frame having a roller circle or race associated therewith, an upper structure having rollers supporting the same on said roller circle or race, a tubular center pin fixed with respect to the truck frame and concentric with the roller circle or race, a shaft journaled in the bore of the center pin to deliver power from the upper structure to the truck frame, a tubular swivel block having radial bearings journaling the block on the center pin, a thrust bearing carried by said block, means adjustable relative to the center pin and engaging said thrust bearing for receiving the center pin tension and for determining the play between the center pin and the said rollers, and means for connecting the upper structure to the tubular swivel block in a manner to cause the said block and the center pin to maintain the rollers registering with the roller circle while permitting the upper structure to freely tilt relative to the truck frame without imposing undue strains, stresses and uneven loads on the swivel block, the center pin and said adjustable means.

7. A center pin construction for locomotive and crawler cranes, shovels, and the like, comprising a car body or truck frame having a roller circle or race associated therewith, an upper structure having rollers supporting the same on said roller circle or race, a tubular center pin fixed with respect to the truck frame and concentric with the roller circle or race, a shaft journaled in the bore of the center pin to deliver power from the upper structure to the truck frame, a bearing element journaled on the center pin for rotary movement only, adjustable means associated with the center pin and the bearing element for receiving the center pin tension and for determining the play between the center pin and the said rollers, and means for connecting the upper structure to the bearing element in a manner to cause the bearing element and the center pin to maintain the rollers registering with the roller circle while permitting the upper structure to freely tilt relative to the truck frame without imposing undue strains, stresses and uneven loads on the bearing element, the center pin and said adjustable means, said connecting means comprising concentric trunnions carried by the bearing element, and sockets formed in the upper structure to receive said trunnions.

8. A center pin construction for locomotive and crawler cranes, shovels, and the like, comprising a car body or truck frame having a roller circle or race associated therewith, an upper structure having rollers supporting the same on said roller circle or race, a tubular center pin fixed with respect to the truck frame and concentric with the roller circle or race, a shaft journaled in the bore of the center pin to deliver power from the upper structure to the truck frame, a tubular swivel block having radial bearings journaling the block on the center pin, a thrust bearing carried by said block, means adjustable relative to the center pin and engaging said thrust bearing for receiving the center pin tension and for determining the play between the center pin and the said rollers, and means for connecting the upper structure to the tubular swivel block in a manner to cause the said block and the center pin to maintain the rollers registering with the roller circle while permitting the upper structure to freely tilt relative to the truck frame without imposing undue strains, stresses and uneven loads on the swivel block, the center pin and said adjustable means, said connecting means comprising concentric trunnions carried by the swivel block, and sockets formed in the upper structure to receive said trunnions.

9. A center pin construction for locomotive and crawler cranes, shovels, and the like, comprising a car body or truck frame having a roller circle or race associated therewith, an upper structure having rollers supporting the same on said roller circle or race, a tubular center pin fixed with respect to the truck frame and concentric with the roller circle or race, a shaft journaled in the bore of the center pin to deliver power from the upper structure to the truck frame, a bearing element journaled on the center pin for rotary movement only, adjustable means associated with the center pin and the bearing element for receiving the center pin tension and for determining the play between the center pin and the said rollers, and means for connecting the upper structure to the bearing element in a manner to cause the bearing element and the center pin to maintain the rollers registering with the roller circle while permitting the upper structure to freely tilt relative to the truck frame without imposing undue strains, stresses and uneven loads on the bearing element, the center pin and said adjustable means, said connecting means comprising concentric trunnions carried by the bearing element, and sockets formed in the upper structure to receive said trunnions and being shaped to allow for taking up play between the center pin and said rollers by said adjusting means.

10. A center pin construction for locomotive and crawler cranes, shovels, and the like, comprising a car body or truck frame, an upper structure rotatably supported thereon, a center pin unit rigid with said frame, and means constituting the sole connection between the upper structure and the center pin unit comprising a bearing element journaled on the center pin for rotary movement only, concentric trunnions formed on the bearing element, and sockets formed in the upper structure to receive said trunnions.

11. A center pin construction for locomotive and crawler cranes, shovels, and the like, comprising a truck frame, an upper structure rotatably supported thereon, a center pin unit rigid with said frame, a bearing element journaled on the center pin unit for rotary movement only and including radial and thrust bearings for said pin, and means for connecting the bearing element to the upper structure to cause the bearing element to center the upper structure on said pin unit while permitting the upper structure to freely rock relative to the bearing element about an axis normal to the center pin axis.

12. A center pin construction for locomotive or crawler cranes, shovels, and the like, comprising a truck frame having a roller circle or race associated therewith, an upper structure having rollers supporting the same on said roller circle or race, a center pin fixed with respect to the truck frame and concentric with the roller circle or race, and means constituting the sole connection between the upper structure and the center pin so constructed and arranged as to permit the upper structure to rotate about the axis of and be centered on the center pin and to rock relative to the center pin about an axis normal to the center pin axis, said means including radial and thrust bearings for the pin.

13. A center pin construction for locomotive and crawler cranes, shovels, and the like, comprising a truck frame having a roller circle or race associated therewith, an upper structure having rollers supporting the same on said roller circle or race, a center pin fixed with respect to the truck frame and concentric with the roller circle or race, and means for journaling the upper structure on the center pin comprising a bearing element journaled on the center pin for rotary movement only and carrying radial and thrust bearings for said pin, and means for connecting the bearing element to the upper structure to cause the bearing element to rotate with the upper structure but to permit the upper structure to freely rock relative to the bearing element about an axis normal to the center pin axis.

14. A center pin construction for locomotive and crawler cranes, shovels, and the like, comprising a truck frame having a roller circle or race associated therewith, an upper structure having rollers supporting the same on said roller circle or race, a center pin fixed with respect to the truck frame and concentric with the roller circle or race, and means constituting the sole centering connection between the upper structure and the center pin comprising a bearing element journaled on the center pin for rotary movement only, concentric trunnions formed on the bearing element, and sockets formed in the upper structure to receive said trunnions.

15. A center pin construction for locomotive and crawler cranes, shovels, and the like, comprising a truck frame having a roller circle or race associated therewith, an upper structure having rollers supporting the same on said roller circle or race, a center pin fixed with respect to the truck frame and concentric with the roller circle or race, and means constituting the sole centering connection between the upper structure and the center pin comprising a tubular swivel block encircling the center pin and carrying radial and thrust bearings for the pin, concentric trunnions formed on the swivel block, and sockets formed in the upper structure to receive said trunnions.

16. A center pin construction for locomotive and crawler cranes, shovels, and the like, comprising a car body or truck frame, an upper structure, a tubular center pin fixed with respect to the truck frame, a shaft journaled in the bore of the center pin to deliver power from the upper structure to the truck frame, a bearing element journaled on the center pin for rotary movement only, adjustable means associated with the center pin and the bearing element for receiving the center pin tension, and means for connecting the upper structure to the bearing element in a manner to permit the upper structure to freely tilt relative to the truck frame without imposing undue strains, stresses and uneven loads on the bearing element, the center pin and said adjusting means.

17. A center pin construction for locomotive and crawler cranes, shovels, and the like, comprising a car body or truck frame, an upper structure, a tubular center pin fixed with respect to the truck frame, a shaft journaled in the bore of the center pin to deliver power from the upper structure to the truck frame, a tubular swivel block having radial bearings journaling the block on the center pin, a thrust bearing carried by said block, means adjustable relative to the center pin and engaging said thrust bearing for receiving the center pin tension, and means for connecting the upper structure to the tubular swivel block in a manner to permit the upper structure to freely tilt relative to the truck frame without imposing undue strains, stresses and uneven loads on the swivel block, the center pin and said adjustable means.

18. A center pin construction for locomotive and crawler cranes, shovels, and the like, comprising a car body or truck frame, an upper structure, a tubular center pin fixed with respect to the truck frame, a shaft journaled in the bore of the center pin to deliver power from the upper structure to the truck frame, a bearing element journaled on the center pin for rotary movement only, adjustable means associated with the center pin and the bearing element for receiving the center pin tension, and means for connecting the upper structure to the bearing element in a manner to permit the upper structure to freely tilt relative to the truck frame without imposing undue strains, stresses and uneven loads on the bearing element, the center pin and said adjustable means, said connecting means comprising concentric trunnions carried by the bearing element, and sockets formed in the upper structure to receive said trunnions.

19. A center pin construction for locomotive and crawler cranes, shovels, and the like, comprising a car body or truck frame, an upper structure, a tubular center pin fixed with respect to the truck frame, a shaft journaled in the bore of the center pin to deliver power from the upper structure to the truck frame, a tubular swivel block having radial bearings journaling the block on the center pin, a thrust bearing for said block, means adjustable relative to the center pin and engaging said thrust bearing for receiving the center pin tension, and means for connecting the upper structure to the tubular swivel block in a manner to permit the upper structure to freely tilt relative to the truck frame without imposing undue strains, stresses and uneven loads on the swivel block, the center pin and said adjustable means, said connecting means comprising concentric trunnions carried by the swivel block, and sockets formed in the upper structure to receive said trunnions.

20. A center pin construction for locomotive and crawler cranes, shovels, and the like, comprising a car body or truck frame, an upper structure, a tubular center pin fixed with respect to the truck frame, a shaft journaled in the bore of the center pin to deliver power from the upper structure to the truck frame, a bearing element journaled on the center pin for rotary movement only, means for connecting the upper structure to the bearing element in a manner to permit the upper structure to freely tilt relative to the truck frame without imposing undue strains, stresses and uneven loads on the bearing element and the center pin, said connecting means comprising concentric trunnions carried by the bearing element, and sockets formed in the upper structure to receive said trunnions.

HILMER N. EKBOM.
EDWARD KORENSKY.
EMIL R. STAEHELIN.